US012788666B2

(12) United States Patent
Lenzi et al.

(10) Patent No.: US 12,788,666 B2

(45) Date of Patent: Nov. 10, 2026

(54) LIGHTWEIGHT POWERED EXOSKELETON WITH PARALLEL ACTUATION FOR FRONTAL AND SAGITTAL PLANE ASSISTANCE

(71) Applicant: University of Utah Research Foundation, Salt Lake City, UT (US)

(72) Inventors: Tommaso Lenzi, Salt Lake City, UT (US); Dante Amico Archangeli, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 19/315,053

(22) Filed: Aug. 29, 2025

(65) Prior Publication Data

US 2026/0060873 A1 Mar. 5, 2026

Related U.S. Application Data

(60) Provisional application No. 63/688,906, filed on Aug. 30, 2024.

(51) Int. Cl.
*A61H 3/00* (2006.01)
*A61H 1/02* (2006.01)

(52) U.S. Cl.
CPC ............ *A61H 3/00* (2013.01); *A61H 1/0244* (2013.01); *A61H 2003/007* (2013.01);
(Continued)

(58) Field of Classification Search
CPC ...... A61H 3/00; A61H 1/0244; A61H 1/0262; A61H 2001/0248; A61H 1/00; A61H 2003/007; A61H 2201/123
See application file for complete search history.

(56) References Cited

U.S. PATENT DOCUMENTS 8,801,641 B2 8/2014 Kazerooni et al.
10,377,036 B2 * 8/2019 Namoun .................... B25J 9/06
(Continued)

FOREIGN PATENT DOCUMENTS

CA 2710677 7/2009
CN 109806549 7/2020
(Continued)

OTHER PUBLICATIONS

Sarkisian et al., Design, Development, and Validation of a Self-Aligning Mechanism for High-Torque Powered Knee Exoskeletons, IEEE Transactions on Medical Robotics and Bionics, vol. 2, No. 2, 2020, 12 pages.

(Continued)

*Primary Examiner* — Margaret M Luarca
*Assistant Examiner* — Sarah B Lederer
(74) *Attorney, Agent, or Firm* — Thorpe North & Western, LLP

(57) ABSTRACT

A powered exoskeleton device for assisting a user's gait in both the sagittal plane and the frontal plane includes a crank frame securable to a user's pelvis and a thigh frame securable to the user's thigh. A pair of linear actuators is each independently and rotatably coupled between the crank frame and the thigh frame. The crank frame and the thigh frame are restrained relative to one another such that actuation of either of the linear actuators creates torque in both the sagittal and the frontal plane.

26 Claims, 10 Drawing Sheets

(52) U.S. Cl.
CPC .. *A61H 2201/123* (2013.01); *A61H 2201/149* (2013.01); *A61H 2201/163* (2013.01); *A61H 2201/1642* (2013.01)

(56) References Cited

U.S. PATENT DOCUMENTS

| | | | | |
|---|---|---|---|---|
| 10,561,564 | B2 * | 2/2020 | LaChappelle | A61H 1/024 |
| 11,123,252 | B2 | 9/2021 | Xue et al. | |
| 11,369,542 | B2 | 6/2022 | Lee et al. | |
| 11,432,988 | B2 | 9/2022 | Vitiello et al. | |
| 11,974,958 | B2 * | 5/2024 | Little | B25J 9/0006 |
| 2012/0172770 | A1 * | 7/2012 | Almesfer | A61H 1/0255 601/23 |
| 2015/0272809 | A1 | 10/2015 | Accoto et al. | |
| 2016/0016309 | A1 | 1/2016 | Swift et al. | |
| 2018/0147108 | A1 * | 5/2018 | Lee | A61H 1/0281 |
| 2021/0369533 | A1 | 12/2021 | Huang et al. | |
| 2022/0133579 | A1 | 5/2022 | Kang et al. | |
| 2022/0388150 | A1 * | 12/2022 | Sugar | B25J 9/0006 |
| 2022/0401284 | A1 * | 12/2022 | Arzanpour | B25J 9/1615 |
| 2023/0330835 | A1 | 10/2023 | Livolsi et al. | |

FOREIGN PATENT DOCUMENTS

| | | |
|---|---|---|
| CN | 113183130 | 7/2021 |
| CN | 113771003 | 12/2021 |
| CN | 218220558 | 1/2023 |
| FR | 3013586 | 5/2015 |
| WO | 2024062364 | 3/2024 |

OTHER PUBLICATIONS

Chiu et al., Design of a Hip Exoskeleton With Actuation in Frontal and Sagittal Planes, IEEE Transactions on Medical Robotics and Bionics, vol. 3, No. 3, 2021, 10 pages.

Leestma et al., Dynamic Duo: Desitn and Validation of an Autonomous Frontal and Sagittal Actuating Hip Exoskeleton for Balance Modulation During Perturbed Locomotion, IEEE Robotics and Automation Letters, vol. 9, No. 5, 2024, 8 pages.

Ishmael et al., ExoProsthetics: Assisting Above-Knee Amputees with a Lightweight Powered Hip Exoskeleton, IEEE 16th International Conference on Rehabilitation Robotics (ICORR), 2019, 6 pages.

Radford et al., Valkyrie: NASA's First Bipedal Humanoid Robot, Journal of Field Robotics, 2015, 23 pages.

Cempini et al., Self-Alignment Mechanisms for Assistive Wearable Robots: A Kinetostatic Compatibility Method, IEEE Transactions on Robotics, vol. 29, No. 1, 2013, 15 pages.

Penzlin et al., Design and First Operation of an Active Lower Limb Exoskeleton with Parallel Elastic Actuation, Actuators, 10, 75, 2021, 21 pages.

Ishmael et al., A Powered Hip Exoskeleton With High Torque Density for Walking, Running, and Stair Ascent, IEEE/ASME Transactions on Mechatronics, vol. 27, No. 6, 2022, 12 pages.

Rogers et al., An Ankle-Foot Prosthesis for Rock Climbing Augmentation, IEEE Transactions on Neural Systems and Rehabilitation Engineering, vol. 29, 2021, 11 pages.

Zhang et al., Design and Experimental Verification of Hip Exoskeleton With Balance Capacities for Walking Assistance, IEEE/ASME Transactions on Mechatronics, vol. 23, No. 1, 2018, 12 pages.

Hsieh et al., Design, Characterization, and Preliminary Assessment of a Two-Degree-of-Freedom Powered Ankle-Foot Prosthesis, Biomimetics, 9, 76, 2024, 17 pages.

Li et al., Position solution and kinematic interference analysis of a novel parallel hip-assistive mechanism, Mechanism and Machine Theory, vol. 120, 2018, pp. 265-287.

* cited by examiner

LIGHTWEIGHT POWERED EXOSKELETON WITH PARALLEL ACTUATION FOR FRONTAL AND SAGITTAL PLANE ASSISTANCE

CROSS REFERENCE TO RELATED APPLICATIONS

This application claims priority to U.S. Provisional Patent Application Ser. No. 63/688,906, filed Aug. 30, 2024, which is incorporated herein by reference in its entirety.

STATEMENT REGARDING FEDERALLY SPONSORED RESEARCH OR DEVELOPMENT

This invention was made with government support under W81XWH-22-1-1028 awarded by the Defense Health Agency, Medical Research and Development Branch, and 2046287 awarded by the National Science Foundation. The government has certain rights in the invention.

BACKGROUND

Limitations to mobility impact millions of individuals worldwide. These challenges can render simple activities like walking or climbing a flight of stairs difficult due to lack of muscle strength, coordination, or balance. Recently, powered ankle and hip exoskeletons have demonstrated the potential to improve mobility in clinical populations by generating sagittal plane torques that can support the human joint function. For example, ankle exoskeletons assisting the user's plantar/dorsiflexion can increase level-ground self-selected walking speed in post-stroke individuals and in children with cerebral palsy. Assisting the user's ankle plantarflexion with an ankle exoskeleton can also decrease the metabolic cost of transport during ramp and stair ascent in individuals with cerebral palsy. Similarly, hip exoskeletons assisting hip flexion/extension can increase level-ground self-selected walking speed in stroke survivors, decrease metabolic cost of transport in above-knee amputees and elderly individuals, and improve recovery after anterior and posterior slip events in elderly individuals and individuals with above-knee amputation. Thus, walking speed and metabolic cost of transport in clinical populations can be improved through exoskeleton assistance to the sagittal plane.

Medio-lateral balance is an important factor in gait. Clinical populations often struggle to maintain medio-lateral balance, putting them at high risk of falling. To maintain mediolateral balance, healthy individuals use their hip abductor and adductor muscles to regulate hip torque in the frontal plane. By controlling frontal plane hip torques, healthy individuals can shift their center of mass with respect to their center of pressure when the foot is in contact with the ground. Moreover, individuals can use frontal plane hip torque to reposition their feet when the foot is off the ground, increasing their base of support in the subsequent step, which also improves balance. However, current exoskeleton assistance strategies have had limited success improving medio-lateral balance of clinical populations. Existing hip exoskeletons that provide assistance in both the sagittal and frontal planes are too heavy and bulky for use in the real world.

SUMMARY

A powered exoskeleton device is provided for assisting a user's gait in both the sagittal plane and the frontal plane.

The exoskeleton device can include a crank frame securable to a user's pelvis and a thigh frame securable to the user's thigh. A pair of linear actuators can each be independently and rotatably coupled between the crank frame and the thigh frame. The crank frame and the thigh frame can be restrained relative to one another such that actuation of either of the linear actuators creates torque in both the sagittal and the frontal plane.

A powered exoskeleton device is also provided for assisting a user's gait in both the user's anatomical sagittal plane and frontal plane. The exoskeleton device can include a crank frame coupled to a pelvis wrap securable to a user's pelvis, and a thigh frame coupled to a thigh cuff securable to the user's thigh. A riser can be rigidly coupled to or formed integrally with the thigh frame and can extend from the thigh frame toward the crank frame. A connecting bar can be revolutely coupled to the crank frame at a sagittal plane joint and revolutely coupled to the riser at a frontal plane joint. A pair of linear actuators can each be independently and rotatably coupled between the crank frame and the thigh frame via passive, two degree-of-freedom ("DOF") joints. The crank frame and the thigh frame can be restrained relative to one another such that actuation of either of the linear actuators creates torque in both the sagittal and the frontal plane. Each of the pair of linear actuators can be positioned laterally to the user and aligned with the user's thigh when the exoskeleton is attached to the user. An added lateral profile of the exoskeleton device can be no greater than 8 cm from the user's body, and an added posterior profile of the exoskeleton device can be no greater than 3 cm from the user's body.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

In the following figures, the term "front" view is defined as being parallel to the frontal plane of a user, while that user is wearing the present technology. A "side" view is defined as being parallel to the sagittal plane of the user, while that user is wearing the present technology. Thus, for example, the page of FIG. 1A, containing a front view, is parallel to the frontal plane, and orthogonal to the sagittal plane. The page of FIG. 1B, containing a side view, is parallel to the sagittal plane and orthogonal to the frontal plane.

Figure 1A:
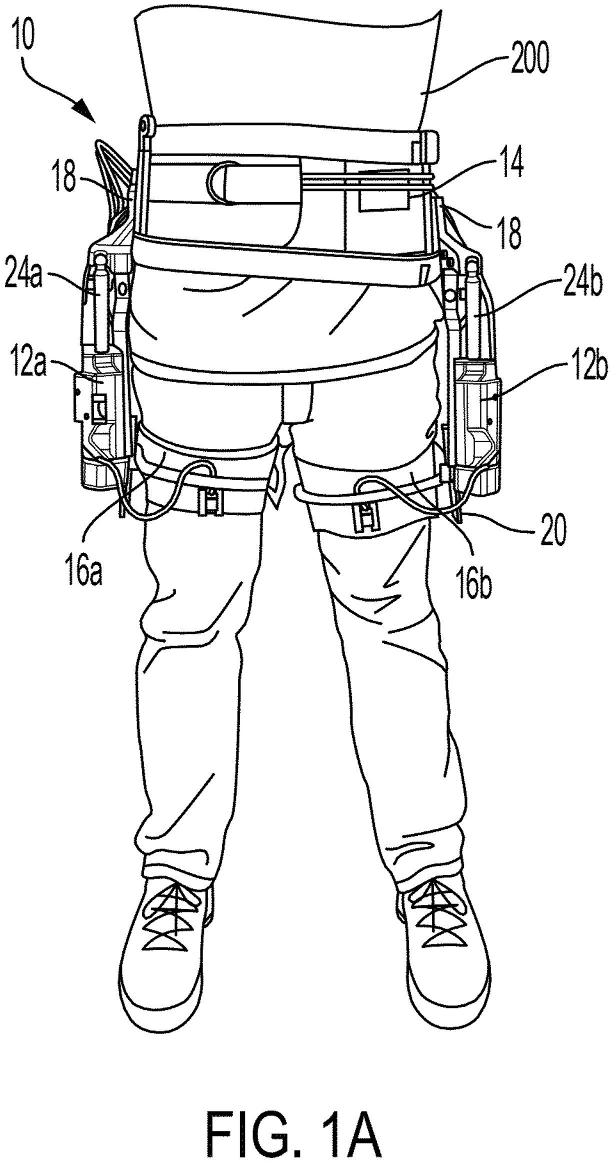
FIG. 1A is a front view of a user wearing an exoskeleton in accordance with an embodiment of the technology.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a bar" can include reference to one or more of such features and reference to "the controller" can refer to one or more of such devices.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Example Embodiments

The present technology provides a lightweight and compact powered exoskeleton that can assist users having reduced or limited mobility. In one example, the present technology provides an alternative kinematic design that can assist in hip abduction/adduction independently of hip flexion/extension angle, and vice versa. The technology utilizes a parallel actuation system to provide a powered hip exoskeleton that is lightweight (5.3 kg), has a slim profile (adding only 3 cm posteriorly, and 8 cm laterally at the hip), and can provide high torque during gait (up to 30 Nm).

In the present specification, when a "front" view is referenced in a figure, that view is understood to be parallel to the frontal anatomical plane of the user, e.g., parallel to the page of FIG. 1A, as if any item being referenced is attached to the user in the configuration shown in FIG. 1A. When a "side" view is referenced, that view is understood to be parallel to the sagittal anatomical plane of the user, e.g., parallel to the page of FIG. 1B, as if any item being referenced is attached to the user in the configuration shown in FIG. 1B. While neither the frontal nor the sagittal planes are shown specifically, one of ordinary skill in the art will readily understand that the frontal plane divides the body into front and back halves, and the sagittal plane divides the body into right and left halves.

Figure 1B:
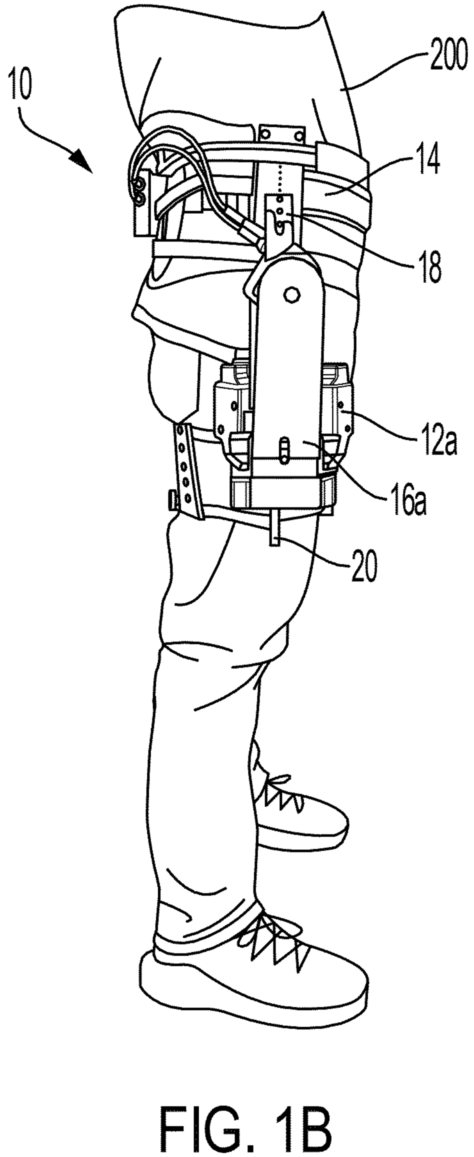
FIG. 1B is a side of the user and exoskeleton of FIG. 1A.

An exemplary application of the technology is shown in FIGS. 1A and 1B, where a user 200 is shown with an assistive exoskeleton 10 shown attached to the user's waist and thighs. In the example shown, the exoskeleton includes two powered hip actuator assemblies 12*a*, 12*b* (one for each leg, which can, in one example, be mirror images of one another) that connect to the user through a pelvis brace 14 and two thigh braces 16*a*, 16*b*. Each actuator assembly can include a crank frame 18 attachable to the pelvis brace, and an extension bar 20 that is attached to, or formed integrally with, a thigh frame 22 (see FIGS. 2A through 3E, for example, and discussed in further detail below).

Figure 2C:
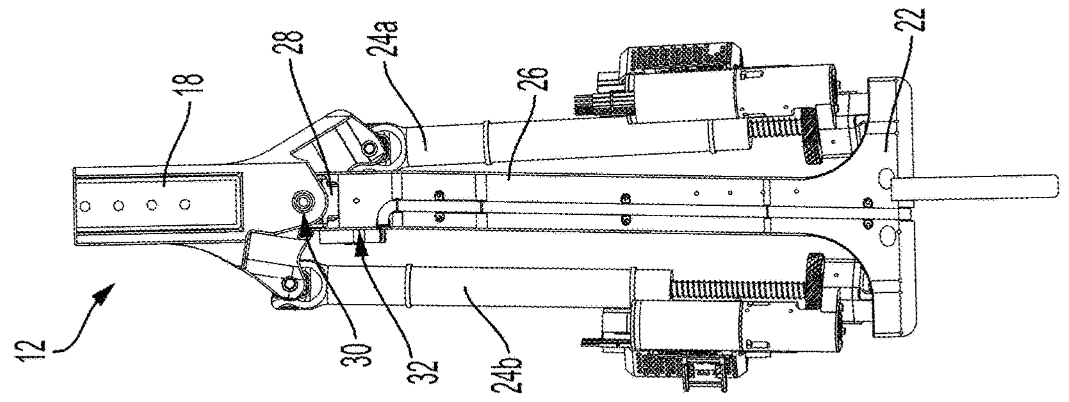
FIG. 2C is an opposing side view of the actuator of FIG. 2A.
Figure 2B:
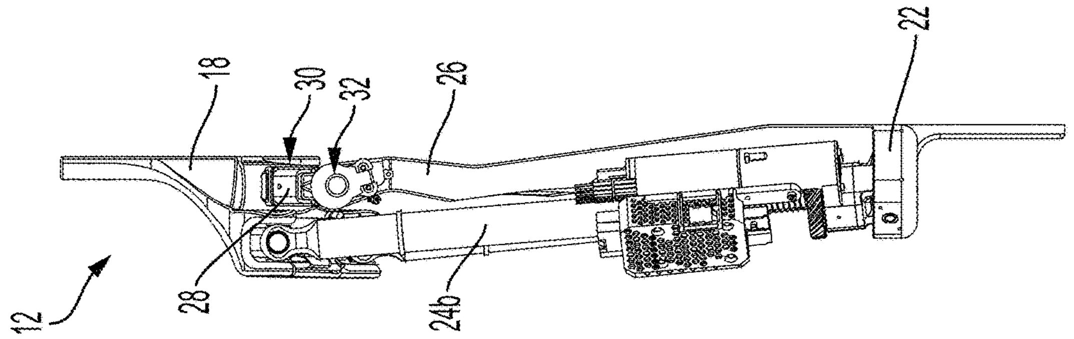
FIG. 2B is a front view of the actuator of FIG. 2A.
Figure 2A:
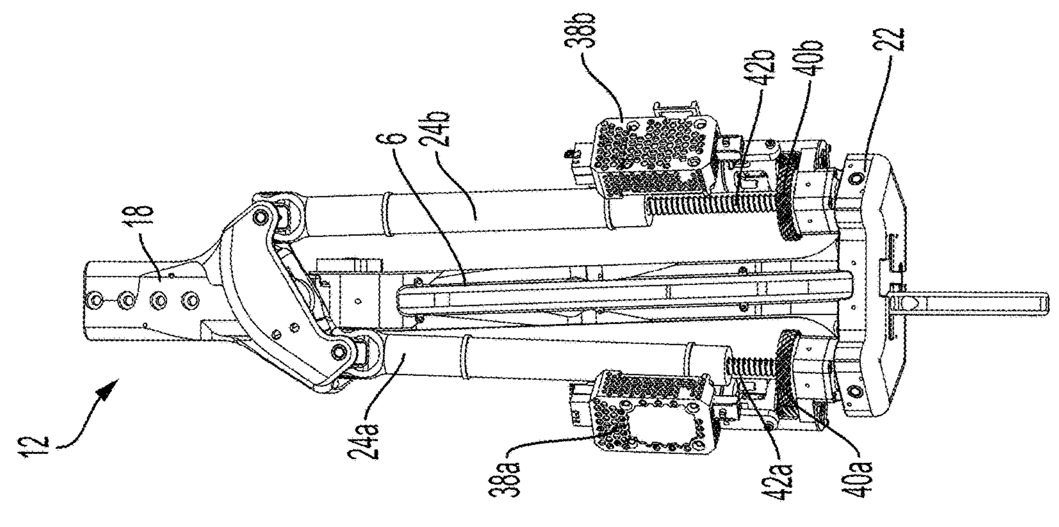
FIG. 2A is a side view of an actuator in accordance with an embodiment of the present technology.

More details of the actuator assemblies 12 are shown in FIGS. 2A through 2C, and in exploded views in FIGS. 3A through 3E. Each assembly can include a crank frame 18 securable to a user's pelvis, and a thigh frame 22 securable to the user's thigh. A pair of linear actuators 24*a*, 24*b*, can each be independently and rotatably coupled between the crank frame and the thigh frame. The crank frame and thigh frame can be restrained relative to one another such that actuation of either of the linear actuators creates torque in both the sagittal and the frontal plane.

The assembly can include a riser 26 that can extend from the thigh frame 22 toward the crank frame 18. A connecting bar 28 can be revolutely coupled between the riser and the crank frame. In one aspect, the riser is rigidly coupled to or formed integrally with the thigh frame. Thus, the position of the riser and the thigh frame relative to one another remains fixed, while the riser is rotatable through two single degree of freedom joints relative to the crank frame. In one aspect, a frontal plane joint 32 (FIG. 2B) of the exoskeleton device is defined where the riser and the connecting bar are revolutely coupled to one another. A sagittal plane joint (30, FIG. 2C) of the exoskeleton device can be defined where the connecting bar and the crank frame are revolutely coupled to one another.

Figures 3A, 3B, 3C, 3D, 3E:
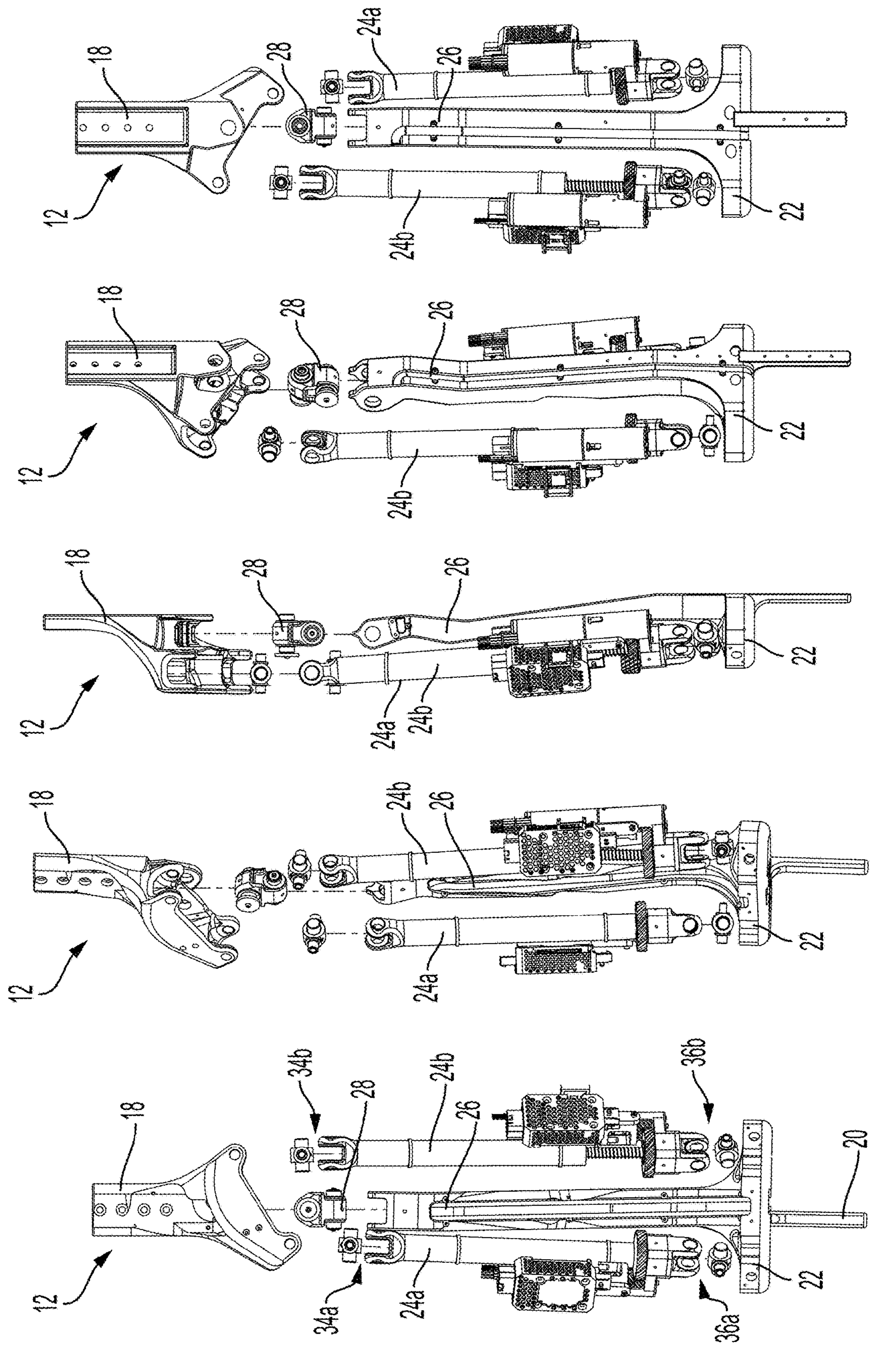
FIG. 3A is a side, partially exploded view of the actuator of FIG. 2A.
FIG. 3B is a partial side view of the actuator of FIG. 3A, rotated slightly from the view of FIG. 3A.
FIG. 3C is a front view of the actuator of FIG. 3A.
FIG. 3D is a partial front view of the actuator of FIG. 3C, rotated slightly from the view of FIG. 3C.
FIG. 3E is an opposing side view of the actuator of FIG. 3A.

Each of the pair of linear actuators 24*a*, 24*b* can be connected to the crank frame 18 via passive, two degree-of-freedom ("DOF") joints 34*a*, 34*b* (see FIG. 3A, for example). Each of the pair of linear actuators can be connected to the thigh frame 22 via passive, two DOF joints 36*a*, 36*b* (see FIG. 3A, for example).

This arrangement of the components results in a system in which actuation of either of the linear actuators 24*a*, 24*b* creates torque in both the sagittal and the frontal plane. The pair of linear actuators apply forces in parallel between the crank frame and the thigh frame. This system has proven to be lightweight and compact and operable to independently control flexion/extension torque and abduction/adduction torque (and/or independently control flexion/extension displacement and abduction/adduction displacement). That is, the magnitude of torque or displacement in one direction need not be tied to a magnitude of torque or displacement in the other (e.g., one is not simply a multiple of the other). This ability to independently control torque in both the frontal and sagittal planes allows the system to more precisely aid in natural gait functions.

To illustrate an example of this, as perhaps best appreciated from FIGS. 2B and 2C, if both actuators 24*a* and 24*b* move equally between the crank frame 18 and the thigh frame. 22, rotation will be generated about joint 32, e.g., rotation in the frontal plane, resulting in abduction or adduction, depending on the direction of the net force. If, however, only one actuator is extended or contracted, or both are extended or retracted with a differential between the two, rotation will be generated about both joint 30 and joint 32, resulting in both abduction/adduction and extension/flexion. In other embodiments, depending on various design parameters, there may be a slight differential in motion between actuators 24*a* and 24*b* to achieve only abduction/adduction.

The present system can thus generate abduction/adduction and extension/flexion using only two linear actuators arranged in a very compact manner aside the hip/thigh of the user. The actuators can be positioned laterally to the user when the exoskeleton is attached to the user, without requiring placement frontally or rearwardly of the user. In one example, an added lateral profile of the exoskeleton is no greater than 8 cm from the user's body, and an added posterior profile of the exoskeleton is no greater than 3 cm from the user's body. The actuators can be aligned with the user's thigh when the exoskeleton device is attached to the user. In this manner, the exoskeleton does not interfere with or obstruct the user's natural movements when walking, sitting, standing, etc.

Existing hip exoskeletons that power both sagittal and frontal plane motion are limited by their series kinematic configuration. In this series configuration, the powered frontal plane joint meant to generate hip abduction/adduction is placed proximal to the powered sagittal plane joints meant to generate hip flexion/extension. With this configuration, at high degrees of hip flexion (e.g., during terminal swing of walking or ascending a step), exoskeleton frontal plane torques cause anatomical hip eversion/inversion torques instead of hip abduction/adduction. Therefore, powered hip exoskeletons using a series kinematic configuration cannot provide hip abduction/adduction torques during terminal swing in level ground walking or when climbing stairs. Moreover, in a series kinematic configuration, the frontal plane actuators are located in the back, preventing the exoskeleton users from sitting comfortably in a chair.

Figure 4A:
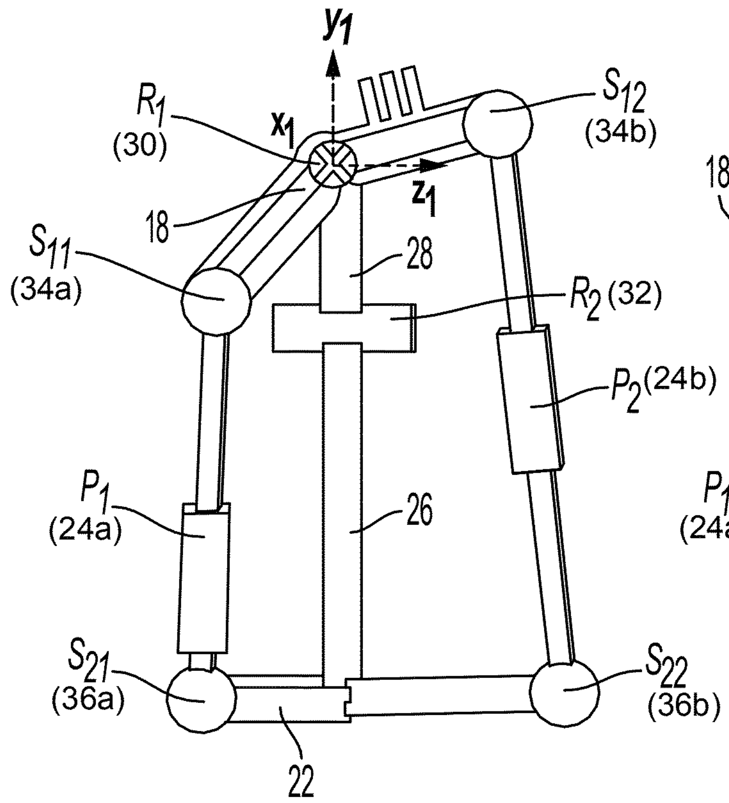
FIG. 4A is a kinematic diagram of a side view of an actuator in accordance with an embodiment of the technology.
Figure 4B:
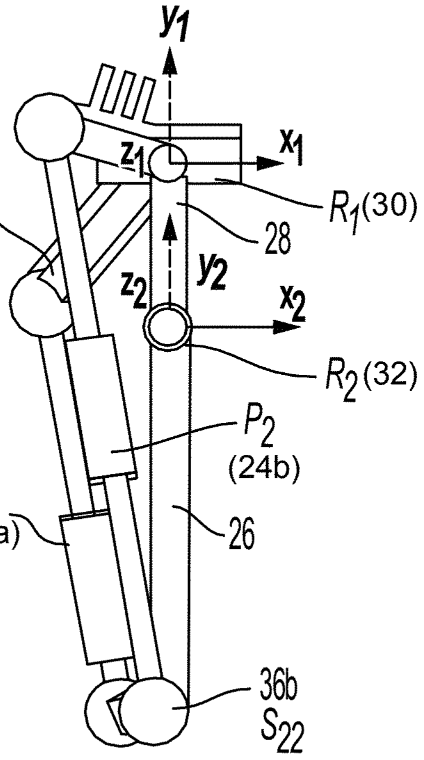
FIG. 4B is a kinematic diagram of a front view of the actuator of FIG. 4A.
Figure 4C:
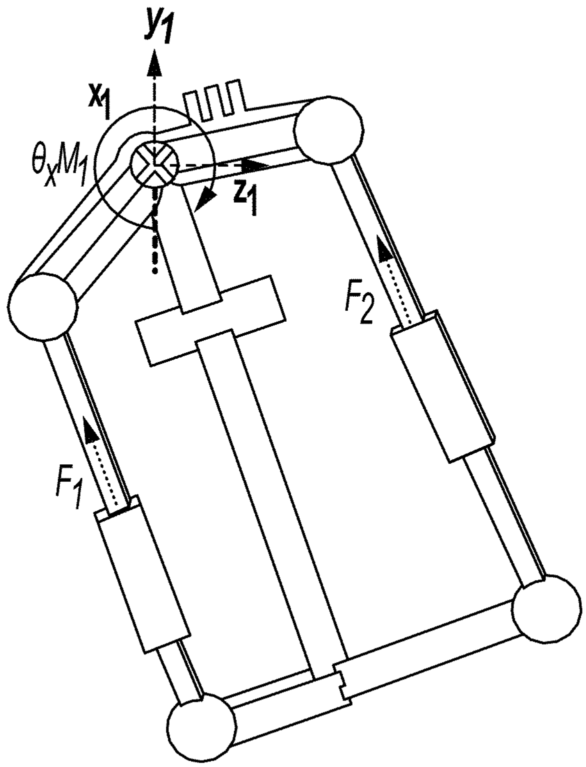
FIG. 4C is another kinematic diagram of a side view of the actuator of FIG. 4A.
Figure 4D:
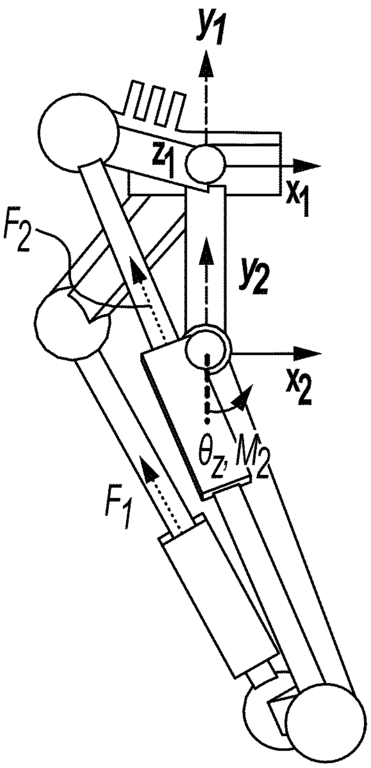
FIG. 4D is another kinematic diagram of a front view of the actuator of FIG. 4A.
Figures 5A, 5B, 5C, 5D, 5E:
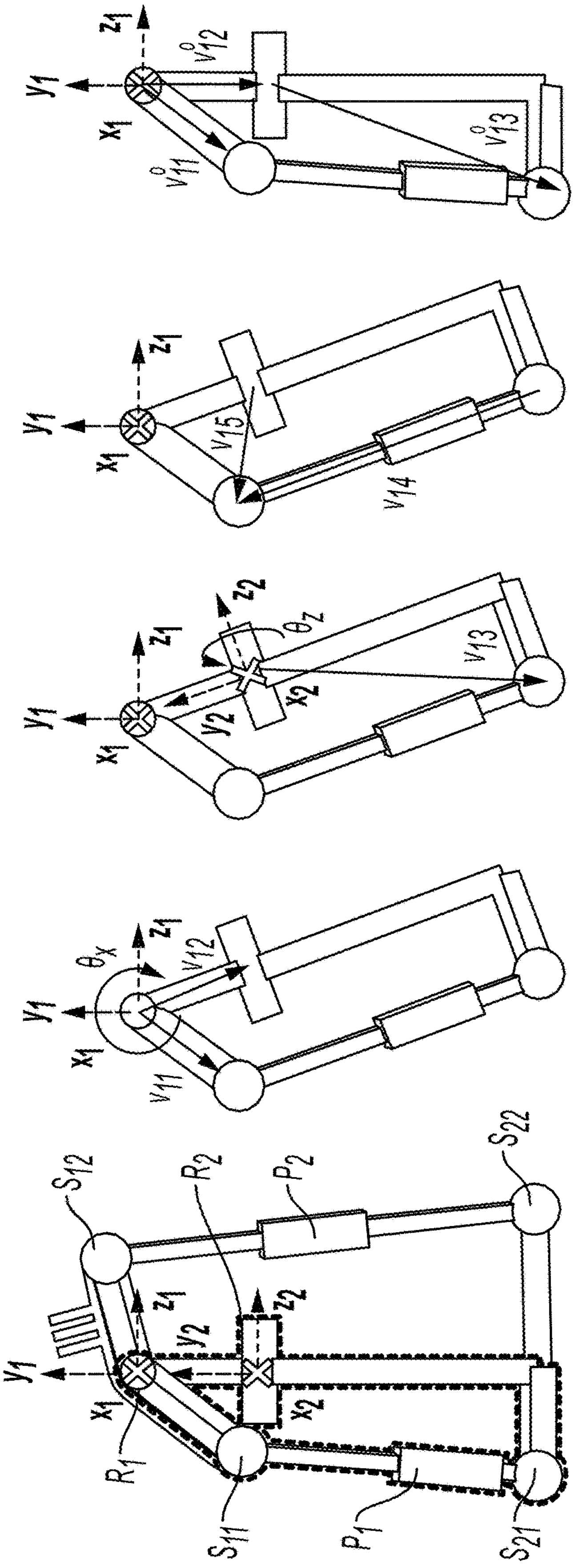
FIG. 5A is a kinematic diagram of a side view of an actuator in accordance with an aspect of the technology, with one kinematic chain highlighted by a dotted outline.
FIG. 5B is a kinematic diagram of a side view of the highlighted kinematic chain of the actuator of FIG. 5A, articulated to 20 degrees of flexion.
FIG. 5C is another kinematic diagram of a side view of the highlighted kinematic chain of the actuator of FIG. 5A, articulated to 20 degrees of flexion.
FIG. 5D is another kinematic diagram of a side view of the highlighted kinematic chain of the actuator of FIG. 5A, articulated to 20 degrees of flexion.
FIG. 5E is a kinematic diagram of a side view of the highlighted kinematic chain of the actuator of FIG. 5A, with the kinematic chain in the zero-angle configuration.

FIGS. 4A through 4D show kinematic diagrams of a hip actuator in accordance with the present technology, with 4A and 4C being side views, and 4B and 4D being front views. The hip actuator unit is constructed from a parallel mechanism with revolute joints $R_1$ and $R_2$ (corresponding to 30 and 32, respectively, in FIGS. 2B and 2C) spherical joints $S_{11}$ (34*a* in FIG. 3A), $S_{12}$ (34*b* in FIG. 3A), $S_{21}$ (36*a* in FIG. 3A) and $S_{22}$ (36*b* in FIG. 3A) and prismatic joints $P_1$ and $P_2$ (linear actuators 24*a*, 24*b* in FIG. 3A). When viewed from the side, the sagittal joint axis is into the page while the frontal joint axis is to the right. Hip extension and hip adduction positions and torques are considered positive. FIG. 4C is a side view showing notation and direction for $\theta_x$ and $M_1$, the position and torque about the sagittal plane joint, $R_1$. Torque $M_1$ is the sum of the torques about revolute joint $R_1$ due to the forces $F_1$ and $F_2$. FIG. 4D is a front view showing notation and direction for $\theta_z$ and $M_2$, the position and torque about the frontal plane joint, $R_2$. Torque $M_2$ is the sum of the torques about revolute joint $R_2$ due to the forces $F_1$ and $F_2$.

Thus, the hip actuator is based on two parallel underactuated five-bar mechanisms comprising spherical (S), revolute (R), and prismatic (P) joints. Combined, the two underactuated kinematic chains $R_1S_{11}P_1S_{21}R_2$ and $R_1R_2S_{22}P_2S_{12}$ create a fully defined kinematic system in which the linear motions of $P_1$ and $P_2$ (i.e., the linear actuators) control the rotations about $R_1$ and $R_2$ (i.e., the hip flexion/extension and abduction/adduction angles).

Kinetostatic Model

The parallel hip actuator provides hip extension/flexion and hip adduction/abduction torques (see FIGS. 4C and 4D, respectively) about revolute joints $R_1$ and $R_2$, respectively. These torques, labeled $M_{1x}$ and $M_{2z}$, are defined by the forces $F_1$ and $F_2$ produced by two linear actuators, modeled as prismatic joints $P_1$ and $P_2$. The relationship between these forces and torques can be expressed as the inverse of the transpose of the velocity Jacobian J.

$$\begin{bmatrix} M_{1x} \\ M_{2z} \end{bmatrix} = J^{-T} \begin{bmatrix} F_1 \\ F_2 \end{bmatrix} \tag{1}$$

Moreover, the velocity Jacobian relates the output joint velocities of $R_1$ and $R_2$ ($\theta'_x$ and $\theta'_z$, respectively) to the velocities of linear actuator $P_1$ and $P_2$.

$$\begin{bmatrix} \dot{\theta}_x \\ \dot{\theta}_z \end{bmatrix} = J \begin{bmatrix} \dot{P}_1 \\ \dot{P}_2 \end{bmatrix} \tag{2}$$

Following the definition of (1), the components of J-T are ratios between the applied force of the linear actuators and their respective moments. We define the inverse of the transpose of the velocity Jacobian as follows:

$$J^{-T} = \begin{bmatrix} TR_{11x} & TR_{12x} \\ TR_{21z} & TR_{22z} \end{bmatrix} \tag{3}$$

where $TR_{11x}$ is the ratio between the applied force $F_1$ and its corresponding moment about and in the direction of joint $R_1$ ($M_{11x}$). $TR_{12x}$ is the ratio between the applied force $F_2$ and its corresponding moment about and in the direction of joint $R_1$ ($M_{12x}$). Similarly, $TR_{21z}$ and $TR_{22z}$ are the ratios between the applied forces $F_1$ and $F_2$ and their respective moments about and in the direction of $R_2$ ($M_{21z}$ and $M_{22z}$).

The specific ratios between the applied forces (i.e., $F_1$ and $F_2$) and the resultant moments ($M_{1x}$ and $M_{2z}$) can be found by independently solving the kinematic chains $R_1S_{11}P_1S_{21}R_2$ and $R_1R_2S_{22}P_2S_{12}$ with grounded components $R_1$, $S_{11}$, and $S_{12}$. Kinematic chains $R_1S_{11}P_1S_{21}R_2$ can be solved to determine the relationship between $M_{11x}$ and $M_{21z}$ and $F_1$.

The kinematic chains $R_1S_{11}P_1S_{21}R_2$ can be described by the dimensions of link $R_1S_{11}$, $R_1R_2$, and $R_2S_{21}$ and the joint angles $\theta_x$ and $\theta_z$ (see FIGS. 4A through 5E). These links are modeled as vectors $v_{11}$, $v_{12}$, and $v_{13}$, respectively. Vector $v_{11}$ is grounded. Vector $v_{12}$ rotates about the x1 axis by $\theta_x$. Vector $v_{13}$ is fixed to the distal end $v_{12}$ and rotates about $z_2$ by $\theta_z$. The specific dimensions of each vector with respect to coordinate system 1 when $\theta_x$ and $\theta_z$ are both zero are listed in Table I. These vectors are labeled with a superscript 0 as in $v_{011}$ to distinguish them from their respective value after a rotational transform is applied. The vectors are described as follows:

$$v_{11} = v_{11}^0,\ v_{11}^0 = \begin{bmatrix} x_{11} \\ y_{11} \\ z_{11} \end{bmatrix} \tag{4}$$

$$v_{12} = R_x(\theta_x)v_{12}^0,\ v_{12}^0 = \begin{bmatrix} x_2 \\ y_2 \\ z_2 \end{bmatrix} \tag{5}$$

$$v_{13} = R_x(\theta_x)R_z(\theta_z)v_{13}^0,\ v_{13}^0 = \begin{bmatrix} x_{12} \\ y_{12} \\ z_{12} \end{bmatrix} \tag{6}$$

where $R_x(\theta_x)$ and $R_z(\theta_z)$ are standard three-dimension rotation matrixes about the x and z axes, respectively.

TABLE I

Design Parameters

| Parameter | Unit | Value |
|---|---|---|
| $V_s$ | V | 29.6 |
| $k_t$ | mNm/A | 14 |
| $R_m$ | Ω | 0.527 |
| $I_{nom}$ | A | 4.64 |
| $H_m$ | $gcm^2$ | 7.68 |
| $H_{TR}$ | $gcm^2$ | 49.9 |
| $\eta_{TR}$ | | 0.9 |
| $\eta_{driver}$ | | 0.9 |
| $TR_g$ | rad/rad | 3.0 |
| $TR_{bs}$ | rad/m | 2513 |
| $v_{11}^0 = (x_{11}, y_{11}, z_{11})$ | mm | (−26, −30, −23) |
| $v_{21}^0 = (x_{21}, y_{21}, z_{21})$ | mm | (−3, −245, −30) |
| $v_{13}^0 = (x_{12}, y_{12}, z_{12})$ | mm | (−25, 7, 37) |
| $v_{22}^0 = (x_{22}, y_{22}, z_{22})$ | mm | (−3, −245, 46) |
| $v_{12}^0 = (x_2, y_2, z_2)$ | mm | (0, −17, 0) |

Vectors $v_{14}$ and $v_{15}$ can be constructed between $S_{11}$ and $R_2$, and $S_{11}$ and $S_{21}$ from $v_{11}$, $v_{12}$, and $v_{13}$.

$$v_{14} = v_{11} - v_{12} - v_{13} \tag{7}$$

$$v_{15} = v_{11} - v_{12} \tag{8}$$

Using these vectors, the transmission ratio can be calculated relating the force $F_1$ applied by prismatic point $P_1$ to the torques $M_{11x}$ and $M_{21z}$.

$$TR_{11x} = -x \cdot \frac{v_{11} \times v_{14}}{|v_{14}|} \tag{9}$$

$$TR_{21z} = -R(\theta_x)z \cdot \frac{v_{15} \times v_{14}}{|v_{14}|} \tag{10}$$

A similar model is constructed from $R_1R_2S_{22}P_2S_{12}$ to calculate the transmission ratio between $M_{12x}$ and $M_{22}z$ and $F_2$ applied by prismatic joint $P_2$ using the shared joints and vector $R_1$, $R_2$, and $v_{12}$, and independent vectors $v_{21}$ and $v_{23}$ constructed from design parameters $x_{21}$, $x_{22}$, $y_{21}$, $y_{22}$, $z_{21}$, $z_{22}$.

Force $F_1$ and $F_2$ are generated by linear actuators powered by high performance brushless motors. These actuators are built with a primary gear stage and a ball screw with transmission ratios $TR_g$ and $TR_{bs}$, respectively. Equations (1) and (2) can be modified to relate the joint torques $M_{1x}$ and $M_{2z}$ and the joint velocity $\theta'_x$ and $\theta'_z$ to the motor torques ($\tau_{m1}$ and $\tau_{m2}$) and velocities ($\theta'_{m1}$ and $\theta'_{m2}$).

$$\begin{bmatrix} \tau_{m1,static} \\ \tau_{m2,static} \end{bmatrix} = J^T \begin{bmatrix} M_{1x} \\ M_{2z} \end{bmatrix} \left( \frac{1}{TR_g TR_{bs}} \right) \tag{11}$$

$$\begin{bmatrix} \dot{\theta}_{m1} \\ \dot{\theta}_{m2} \end{bmatrix} = J^{-1} \begin{bmatrix} \dot{\theta}_x \\ \dot{\theta}_z \end{bmatrix} (TR_g TR_{bs}) \tag{12}$$

Thus, using (9)-(12) it is possible to relate hip actuator joint torques and velocities to motor torques and velocities. These relationships are used in a simulation framework to identify critical exoskeleton dimensions.

Simulation Framework

A simulation framework can be used to guide the design of the powered hip actuator. The simulation framework captures the dynamic behavior of the parallel actuator mechanism by integrating an electromechanical model of the brushless motor with the kinetostatic model shown in the previous section. The simulation framework can take as input the desired torque, position, and velocity of the output hip abduction and hip extension joints derived from walking and stair climbing datasets. Based on these inputs, the framework calculates motor current and voltage for a specific parameter set describing the dimensions of the linkages. The dynamic model accounts for the inertial torque due to the motor (Hm) and the transmission system ($H_{TR}$). Mechanical losses can be accounted for of the linear actuator using an efficiency term $\eta_{TR}$. Using the motor torque (11) and velocity (12) we calculate the motor current ($i_{m1}$ and $i_{m2}$) and subsequently motor voltage ($V_{m1}$ and $V_{m2}$) for each actuator as follows:

$$\begin{bmatrix} i_{m1} \\ i_{m2} \end{bmatrix} = \frac{1}{k_t} \left( \frac{1}{\eta_{TR}} \begin{bmatrix} \tau_{m1,static} \\ \tau_{m2,static} \end{bmatrix} + \left( H_m + \frac{H_{TR}}{TR_g^2} \right) \begin{bmatrix} \ddot{\theta}_{m1} \\ \ddot{\theta}_{m2} \end{bmatrix} \right) \tag{13}$$

-continued $$\begin{bmatrix} V_{m1} \\ V_{m2} \end{bmatrix} = R_m \begin{bmatrix} i_{m1} \\ i_{m2} \end{bmatrix} + k_t \begin{bmatrix} \dot{\theta}_{m1} \\ \dot{\theta}_{m2} \end{bmatrix} \tag{14}$$

where $R_m$ is the resistance of the motor windings and $k_t$ is the motor constant. The effect of inductance is neglected in this model. After the motor voltage and current are calculated, the simulation framework checks that the motor root mean square current is less than the nominal motor current ($i_{nom}$) and that the motor voltage is less than the supply voltage ($V_s$), accounting for losses in the motor driver ($\eta_{driver}$):

$$\left( \begin{bmatrix} i_{m1}^{rms} \\ i_{m2}^{rms} \end{bmatrix} < i_{nom} \right) \& \left( \begin{bmatrix} |V_{m1}| \\ |V_{m2}| \end{bmatrix} < \eta_{driver} V_s \right) \tag{15}$$

Using the simulation framework, we can explore the design space to understand the effect of the different parameters on performance.

Design:

An iterative design approach was used to explore the influence of critical design parameters on the powered hip actuator performance and size. The simulation framework takes as input, a list of powered hip design parameters, human hip biomechanics for walking and stair ascent, and motor specifications. Leveraging the kinetostatic model and simulation framework, motor performance can be predicted. Table I shows the selected design parameters. The large number of design parameters and preference for a search grid with a small step size creates a simulation with high time complexity. The design space can be reduced by constraining the shape of the hip actuator and identifying parameters with reduced impact on the hip actuator performance.

Figure 6A:
FIG. 6A is an isometric view of kinematic diagram of an actuator in accordance with an aspect of the technology.
Figure 6A:
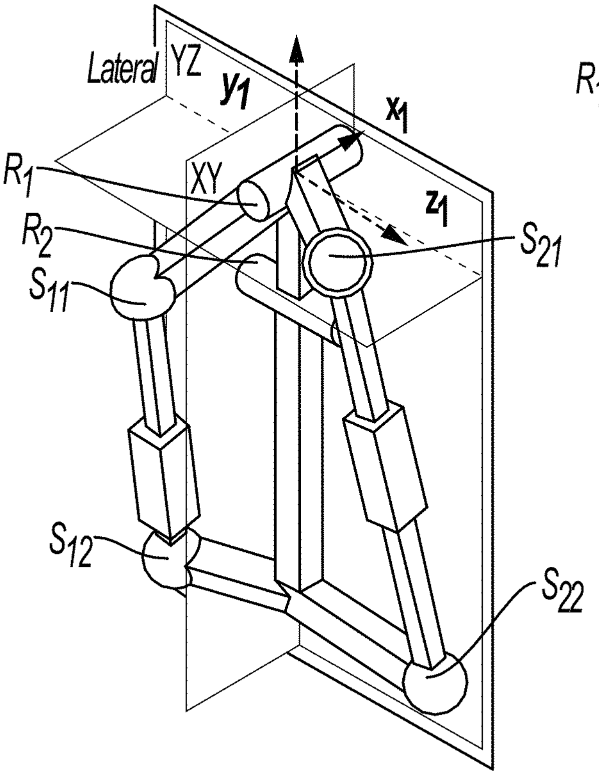
Figure 6B:
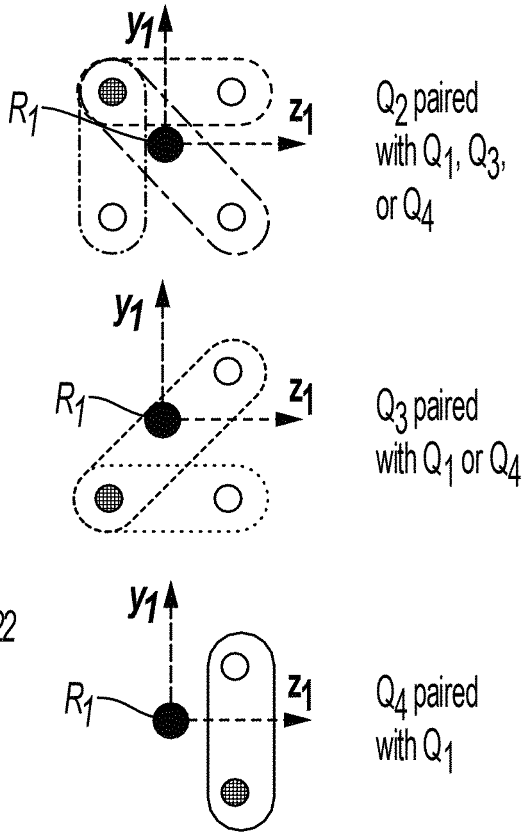
FIG. 6B is a schematic representation of six potential locations for the actuator primary spherical joints, $S_{11}$ and $S_{12}$.
Figure 6C:
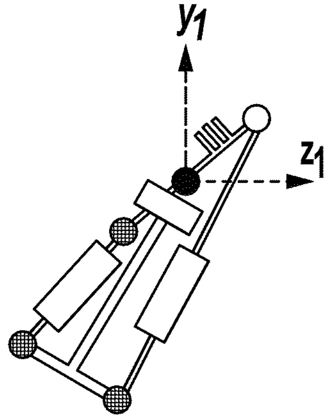
FIG. 6C is a schematic representation of an exemplary 30-degree extension pivot.
Figure 6D:
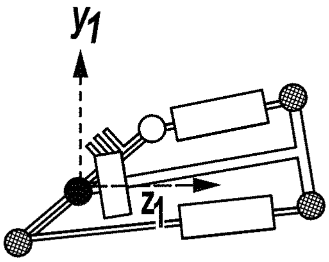
FIG. 6D is a schematic representation of an exemplary 100-degree flexion pivot.

FIG. 6A shows an isometric view of an exemplary schematic design. In this view, the lateral side of the YZ plane for a right-sided actuator is called out. FIG. 6B shows six potential locations for the actuator primary spherical joints $S_{11}$ and $S_{12}$. FIGS. 6C and 6D show where actuator pivots can be located in the $1^{st}$ and $3^{rd}$ quadrants to create a compact design and to prevent collisions between the two linear actuators, frame, and crank.

The hip actuator can be built such that the proximal spherical joints of the linear actuators (see $S_{11}$ and $S_{12}$, FIG. 6A) are located in one of the eight cartesian octants. To reduce the actuator lateral size, the proximal spherical joints can be placed on the same side of the YZ plane and close to $R_1$. To reduce potential contact with the user, the linear actuators and thus spherical joints can be placed on the lateral aspect of YZ plane. When designing a right-side hip actuator, this would force the x coordinate of $v_{11}$ and $v_{21}$ to be negative which reduces the eight octants to four quadrants in the YZ plane (see FIG. 6A). The proximal spherical joints can be located in the same quadrant but, due to the size of the spherical joint (e.g., about 25 mm in diameter), this would be difficult to manufacture while still maintaining a compact actuator. Based on these design constraints, there are six general combinations for the location of the spherical joints (i.e., $S_{11}$ located in quadrant 2 and $S_{12}$ located in quadrant 1, 3, or 4; $S_{11}$ located in quadrant 3 and $S_{12}$ located in quadrant 1 or 4; $S_{11}$ located in quadrant 4 and $S_{12}$ located in quadrant 1; FIG. 6B). Of the six combinations, only one combination ($S_{11}$ located in quadrant 3 and $S_{12}$ located in quadrant 1, FIGS. 6C and 6D) allows for 30° of hip extension and 100° of hip flexion while placing the proximal spherical joints close to $R_1$.

Placement of the distal spherical joints ($S_{21}$ and $S_{22}$) was found to have little impact on the device performance and was selected to increase the minimum distance between the two linear actuators across the device range of motion. Using these restrictions, the number of simulation parameters can be reduced.

In addition to restricting the domain of design parameters that describe the kinematic behavior of the device, it is also possible to predetermine a finite number of ball screw and primary gear stage transmission ratios ($TR_{bs}$, $TR_g$ respectively). Notably, these mechanical elements scale the velocity Jacobian. Thus, for the same peak transmission ratio, decreases in the velocity Jacobian can be compensated by increases in the ball screw and primary gear stage transmission ratio. To satisfy the desire for a compact device, the spherical joints are placed close to $R_1$ which sets the peak transmission ratio achieved across the range of motion.

In doing so, combinations of stock ball screw and gear pairs can be identified that scale the transmission ratio to an acceptable range. Thus, the primary gear ratio and ball screw ratio can be reduced to a small number of combinations based on the range of acceptable proximal spherical joint geometries and the availability of stock components.

During level ground walking, the simulation framework predicts that the hip actuator built according to design parameters in Table I can produce 28.5 Nm of frontal-plane assistance and 25.5 Nm of sagittal-plane assistance with a root mean square current and peak voltage of 4.64 A and 14.4 V, respectively. These peak torque values correspond to 28.2% of the biological torques for a $95^{th}$ percentile male (i.e., 122.6 kg). At this level of assistance, the hip actuator injects a total of 10.9 J of mechanical energy into the gait cycle and absorbs a total of 7.2 J of mechanical energy. Accounting for thermal losses, the actuator consumes 24.5 J of electrical energy per stride. The predicted maximum torque increases when the exoskeleton acts to produce torque only in the frontal or sagittal plane. Specifically, the simulations predict that the actuators can produce 30.3 and 48.2 Nm when assisting in only the sagittal or frontal plane, respectively.

During stair ascent, the simulation framework predicts that the hip actuator can produce 28.4% of the biological torque for a $95^{th}$ percentile male. These values correspond to 34.0 Nm of frontal plane assistance and 14.9 Nm of sagittal plane assistance, with a root mean square current and peak voltage of 4.64 A and 12.9 V, respectively. At this level of assistance, the hip actuator injects a total of 16.6 J of mechanical energy into the gait cycle and absorbs a total of 1.1 J of mechanical energy. Accounting for thermal losses, the actuator consumes 38.1 J of electrical energy per stride. When acting to produce only frontal plane torque or only sagittal plane torque, the actuators can produce up to 38.4 and 67 Nm of assistance, which is substantially higher than when producing torque in both planes simultaneously. Thus, the simulation framework predicts that the parallel hip actuator can provide similar performance to existing autonomous exoskeletons.

Mechanics:

In one exemplary embodiment, the powered hip actuator was built based on the design parameters reported in Table I. Each hip actuator can be powered by two identical linear actuators 24*a*, 24*b* (see, e.g., FIGS. 2A through 3E). Each linear actuator can include a brushless DC motor, 38*a*, 38*b* in FIG. 2A (in one example, a Maxon, 323218, EC-4pole 22 mm, 90 W, 24 V), a primary gear stage 40*a*, 40*b* in FIG. 2A (in one example, Boston Gears, 3:1), and a ball screw 42*a*, 42*b* in FIG. 2A (in one example, Ewellix, 8×2.5 mm). The primary gear stage and ball screw can be covered by plastic shields that protect the transmission from debris. An active cooling system can provide forced heat convection, reducing the motor thermal resistance. A similar system has demonstrated a 39% increase in the continuous current of the motor. The linear actuators can be connected to the thigh frame (22) and crank frame (18) through passive two-degree of freedom joints (see 34*a*, 34*b*, 36*a*, 36*b*, FIGS. 3A through 3E). These joints construct a 2-force body about the linear actuator and accommodate frontal and sagittal plane hip motion. The powered hip frame, crank, and two linear actuators construct two coupled five-bar mechanisms. Independently, these mechanisms are similar to a four-bar inverted slider crank. The powered hip frame, crank, connecting bar, and two-degree of freedom joints can be made from custom-machined aluminum. Dry bushings (IGUS) provide low friction and low-weight revolute motion.

The actuator assemblies can be rigidly connected to a compliant torso interface (e.g., the pelvis wrap 14, FIGS. 1A and 1B). The torso interface can be built from a compliant lower spine orthosis (in one example, Ottobock). Compliant thermoplastic pads can be placed beneath the orthosis. The exoskeleton crank frame 18 can be connected to a rigid crossbar that is mounted on the thermoplastic pads. The power supply, e.g., battery and high-level electronic motherboard can be placed posteriorly on the torso interface. The compliant torso interface can be adjusted to fit both small and large individuals and the hip actuator can be mounted at various points along the rigid crossbar.

The actuator assemblies can be connected to a thigh brace through a self-aligning mechanism. The mechanism can be built from a prismatic and revolute joint which allows for dynamic alignment of the powered joints to the human hip joint center of rotation, thus reducing spurious forces and torques between the exoskeleton and the user. The thigh brace can be made from a rigid bar and mesh band. The rigid bar can be located on the anterior aspect of the thigh and connected to the mesh band at the medial and lateral aspects. The posterior aspect of the mesh band can be tightened around the thigh using a BOA lacing system (in one example, Click-Medical). This system distributes the forces of the exoskeleton equally across the brace.

Testing:

In benchtop testing, the hip actuator steady-state error, actuator bandwidth, and impedance were estimated by performing benchtop tests. The hip actuator crank was connected to a grounded six-axis force-torque sensor (Sunrise Instruments M3713D). The hip actuator joints were both set to zero degrees and the distal portion of the exoskeleton frame was also grounded. Five Nm of preload was applied, and we commanded torque steps of 5 or 15 Nm in three separate conditions: frontal plane torque, sagittal plane torque, and combined torque. Forces and torques measured at the load cell were reflected to the hip actuator joint centers. Each step was conducted 5 times, and the results are reported in FIG. 7A, FIG. 7B and FIG. 7C. The rise time, percent overshoot, and steady-state error, were extracted from each trial and averaged. Across the 6 experimental conditions, the risetime, percent overshoot, and rms steady state error were found to be between 9.4 and 17.2 ms, 6.9% and 39.3%, and 0.2 and 1.0 Nm.

Figure 7A:
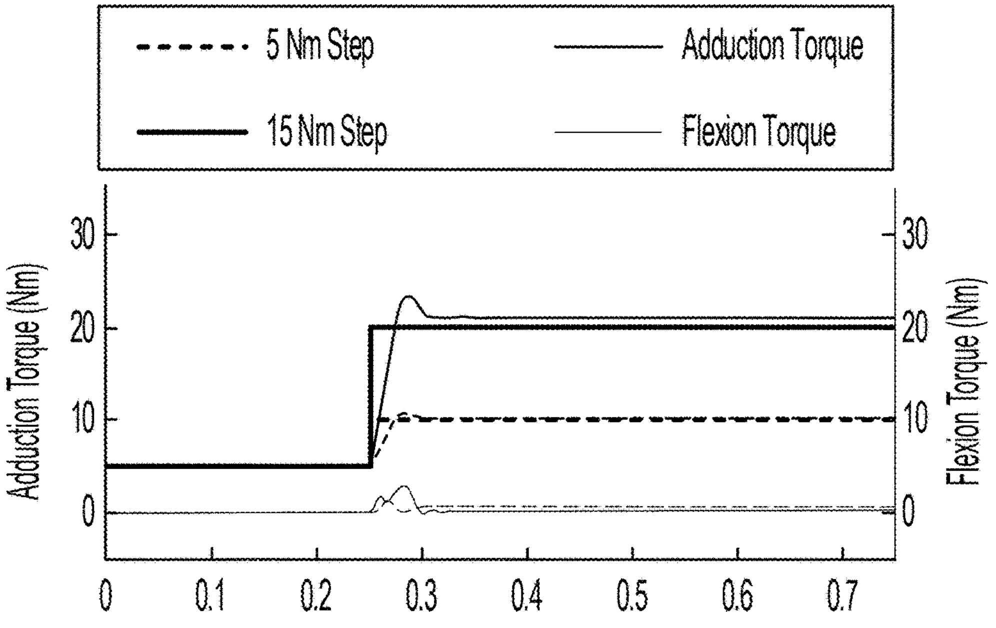
FIG. 7A is a data graph showing exoskeleton generated torque in response to step increase in desired torque in accordance with an example of the technology (frontal plane torque)
Figure 7B:
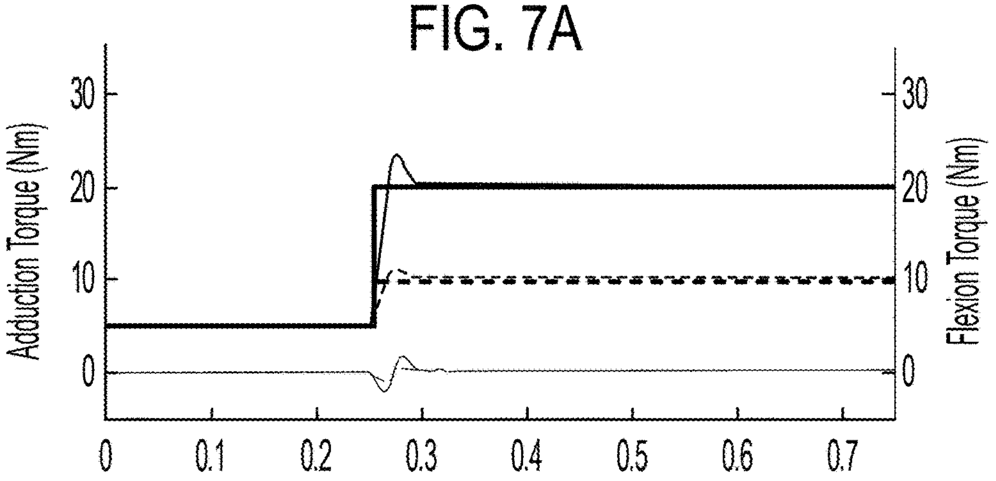
FIG. 7B is a data graph showing exoskeleton generated torque in response to step increase in desired torque in accordance with another example of the technology (sagittal plane torque)
Figure 7C:
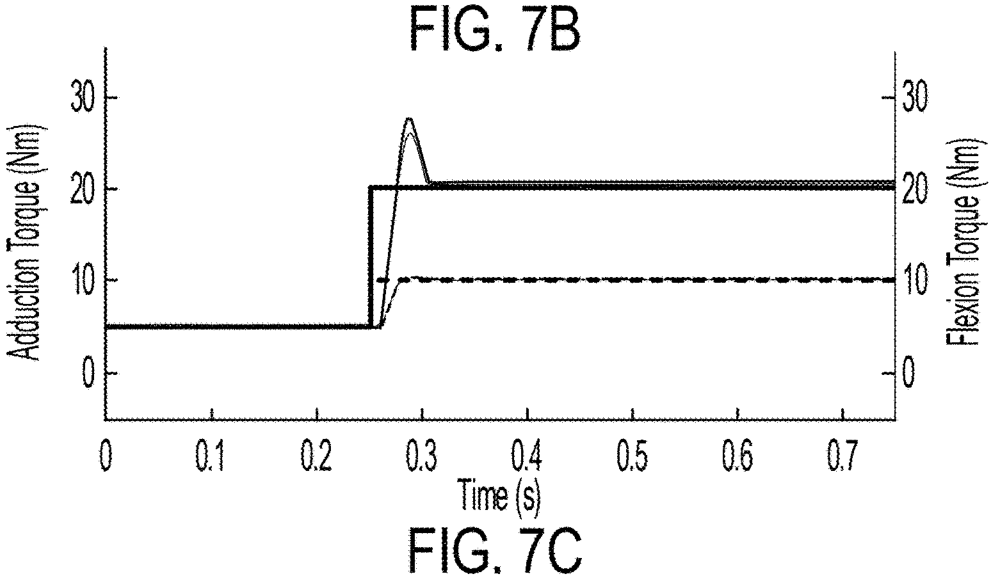
FIG. 7C is a data graph showing exoskeleton generated torque in response to step increase in desired torque in accordance with another example of the technology (both frontal and sagittal plane torque)

FIGS. 7A through 7C show exoskeleton generated torque in response to step increase in desired torque. In all conditions, 5 Nm of preload torque were applied before administering the step increase in torque. Frontal plane torque (adduction) and sagittal plane torque (flexion) are shown by differing crosshatch. Two steps are applied, one of 5 Nm and one of 15 Nm. Exoskeleton performance in response to a step increase is shown in (top) frontal plane torque, (middle) sagittal plane torque, and (bottom) both frontal and sagittal plane torque. The benchtop testing indicated that an exoskeleton user will experience limited resistance when walking or running.

TABLE IV

| Subject Demographics | | | | | |
|---|---|---|---|---|---|
| | S1 | S2 | S3 | S4 | S5 |
| Gender | F | M | F | M | M |
| Age (yr) | 25 | 29 | 22 | 25 | 24 |
| Walking Speed (mph) | 2.0 | 2.4 | 2.4 | 2.4 | 1.5 |
| Mass (kg) | 69.1 | 63.6 | 54.0 | 96.4 | 95.0 |

In human testing, the performance of the control algorithm, the torque capability of the device, and the ability of the unilateral hip exoskeleton to modify step width were tested on five healthy young subjects (body mass 75±19 kg, age 25±2.5 years, mean±standard deviation) that were familiar with the exoskeleton operation (see Table IV).

Each subject tested five experimental conditions aiming to assess the relationship between frontal plane assistance and step width. The experimental conditions were transparent mode (i.e., no exoskeleton assistance), and sagittal plane assistance with either positive or negative frontal plane assistance during the stance or swing phase of walking, for a total of five different experimental conditions. The order of the experimental conditions per subject was randomized.

In each experimental condition, subjects walked at their self-selected speed on an instrumented treadmill while receiving a Gaussian shaped assistance profile scaled by body weight. The sagittal plane assistance profile was inspired by our previous research assisting the residual limb of transfemoral amputees. The frontal plane profiles and timing were selected to explore the impact of frontal plane torque on step width and to match prior research that explored abduction assistance during the stance phase of walking. The magnitude of the assistance profile was determined following pilot experiments with the heaviest subject. During these pilot studies, the experimenters tuned the torque profiles to achieve the maximum level of assistance without reaching the voltage limit of the battery or the continuous current limit of the motor. This maximum torque was then normalized by body weight. The flexion assistance magnitude was set to 0.32 Nm/kg and peaked at toe-off, while the extension assistance magnitude was set to 0.21 Nm/kg and peaked immediately after heel strike. Frontal plane assistance during stance was tuned to peak midway through stance phase and set to 0.21 Nm/kg. Frontal plane assistance during swing was tuned to peak immediately before heel strike to have the largest impact on step width and peaked at 0.11 Nm/kg.

For each subject and condition separately, we segmented the exoskeleton assistive torque, joint angle, and estimated gait-phase, as well as the subject's hip angle and stride width into individual strides using the ground reaction force for the right leg as measured by the instrumented treadmill. After segmentation, we averaged the last ten strides to calculate the mean trajectory for the exoskeleton applied torque and joint angle and for the biomechanical hip angle for each experimental condition and subject. For the last ten strides, we also calculated the maxima and minima of the applied torque, the time of peak sagittal plane torque, the average step width during double support, and the average value of exoskeleton phase reset and averaged them for each subject, experimental condition, and variable. Unless otherwise stated, values are reported as mean±standard error of the mean.

Figure 8A:
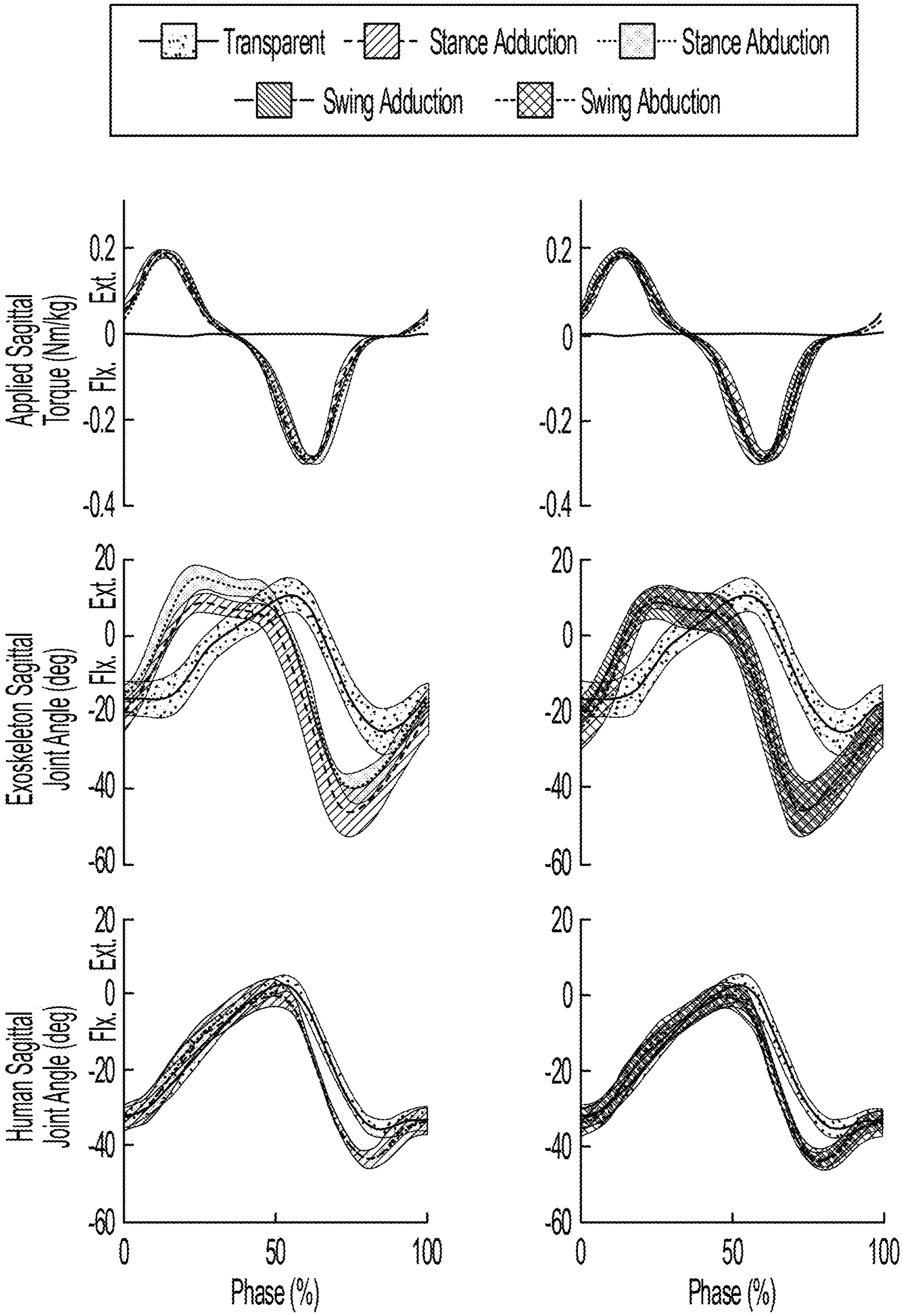
FIG. 8A is a data graph showing exoskeleton and human performance in the sagittal plane for an actuator and leg in accordance with an aspect of the technology.
Figure 8B:
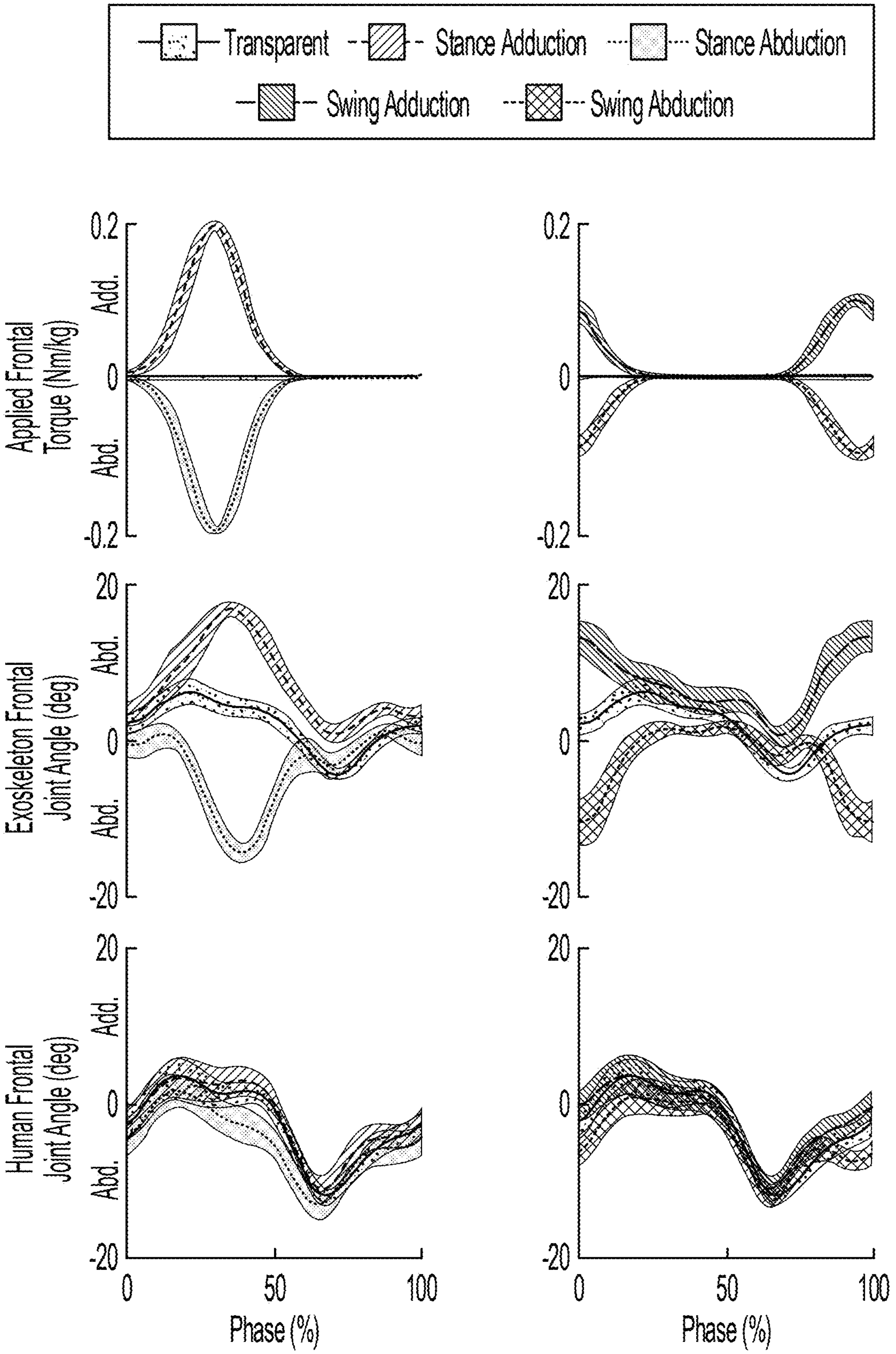
FIG. 8B is a data graph showing exoskeleton and human performance in the frontal plane for an actuator and leg in accordance with an aspect of the technology.

Across the powered trials, the exoskeleton provided an average peak flexion assistance of 0.32 Nm/kg and an average peak extension assistance of 0.21 Nm/kg (see FIG. 8A, top plot). The average peak frontal plane assistance during swing was 0.11 Nm/kg while the average peak frontal plane assistance during stance was 0.21 Nm/kg (see FIG. 8B, top plot). For the heaviest subject, the peak sagittal plane torque was 30.3 Nm and the peak frontal plane torque was 20.2 Nm. The peak sagittal plane torque occurred at 61.0±1.7%, 62.0±1.7%, 60.2±1.7%, 61.3±1.7% of gait phase for the four assistance conditions: stance adduction, stance abduction, swing adduction, and swing abduction. Across the four powered conditions and subjects, the exoskeleton hip actuator produced an average of 33.2±1.5 J (range: 24.9 to 55.6 J) of mechanical energy and consumed an average of 40.1±1.6 J (range: 29.3 to 71.8 J) of electrical energy per stride. This equates to an average efficiency of 84.1%±2.5% (range: 74.0% to 92.3%). Considering the 6 W of electric power used by the high-level electronics, the bilateral exoskeleton equipped with a 128 kJ battery can assist on average 3120±80 steps (range: 1700 steps to 3900 steps).

It was found that exoskeleton assistance modified the exoskeleton and human hip joint kinematics. The magnitude of both the exoskeleton and anatomical hip flexion angle at peak flexion assistance increased between the transparent and four powered conditions (see FIG. 8A). In contrast, only the magnitude of the exoskeleton extension angle at peak extension assistance increased substantially between the transparent mode and the four powered conditions. The magnitude of the exoskeleton and anatomical hip abduction angle at peak stance and swing abduction assistance increased between the transparent mode and the two powered conditions with abduction assistance (see FIG. 8B). In contrast, only the adduction exoskeleton joint angle at peak stance and swing adduction assistance increased substantially between the transparent mode and the two powered conditions with adduction assistance (see FIG. 8B).

Figure 9A:
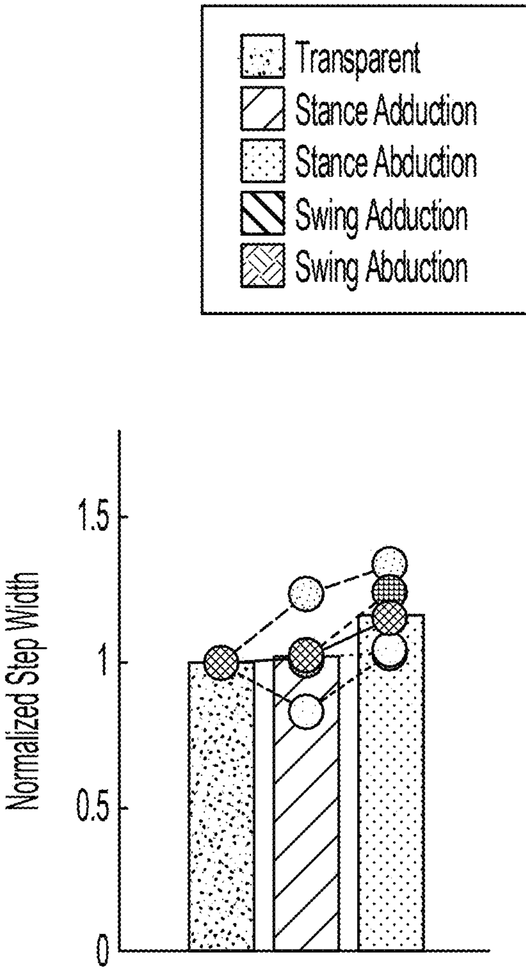
FIG. 9A is a data graph showing average normalized step width of a test subject with respect to transparent mode for frontal plane assistance during the stance phase.
Figure 9B:
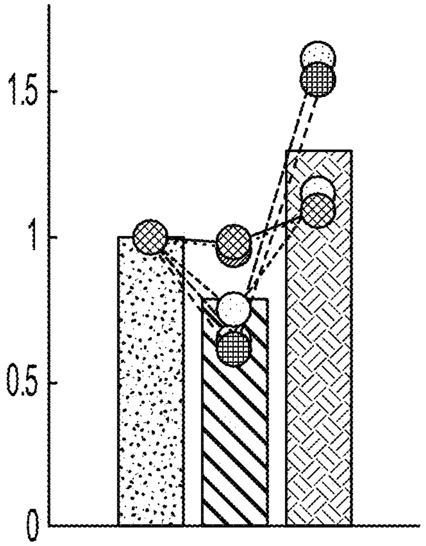
FIG. 9B is a data graph showing average normalized step width of a test subject with respect to transparent mode for frontal plane assistance during the swing phase.

It was found that exoskeleton assistance in the frontal plane modified the base of support. When the exoskeleton applied adduction or abduction torque during stance, the step width normalized by the baseline (transparent mode) was 1.05±0.07 and 1.14±0.04, respectively (see FIG. 9A). In contrast, when the exoskeleton applied adduction or abduction torque during swing, the step width normalized by the baseline was 0.86±0.07 and 1.24±0.08, respectively (see FIG. 9B).

Gait phase evolution was estimated by the exoskeleton using an adaptive oscillator and finite-state machine. Across the four powered experimental conditions, the phase estimate reset on average at 101% and the maximum error at phase reset was 3.1%.

The testing indicated that, by generating torque in both the sagittal and frontal planes, the present exoskeletons improved gait economy and balance in individuals with poor mobility. This present parallel actuator approach enables a powered hip exoskeleton that is substantially lighter, more compact, and more ergonomic than previous devices, while still generating similar levels of torque. Human studies with five healthy young adults show that the powered hip exoskeleton, controlled with a state machine and adaptive frequency oscillators, can consistently generate torques in the frontal and sagittal plane. Moreover, the application of torques in the frontal plane alters step width, a key component of balance.

In one embodiment, the exoskeleton does not use force sensing and closed loop control. Bench top testing shows that the feed forward compensations reduce the reflected damping and inertia by 68% and 35%, respectively, achieving high backdrivability. These tests also show that the hip actuator has a maximum steady state RMS error of 1.0±0.1 Nm for large torque steps and a minimum bandwidth of 19.4 Hz. These results indicate that the exoskeleton has sufficient bandwidth to perform dynamic ambulation tasks.

Much of the discussion above focused on use of the present actuators to assist users at the hip joint. However, it is to be understood that the present technology can be readily adapted to assist in a variety of joint anatomies, such as wrists, knees, ankles, etc.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A powered exoskeleton device for assisting a user's gait in both the sagittal plane and the frontal plane, the exoskeleton device comprising:
- a crank frame securable to a user's pelvis;
- a thigh frame securable to the user's thigh; and
- a pair of linear actuators, each independently and rotatably coupled between the crank frame and the thigh frame;
- the crank frame and thigh frame being restrained relative to one another by a parallel linkage including the pair of linear actuators such that actuation of either one of the linear actuators creates torque in both the sagittal and the frontal plane.

2. The device of claim 1, further comprising:
- a riser, extending from the thigh frame toward the crank frame; and
- a connecting bar coupled between the riser and the crank frame by a revolute joint.

3. The device of claim 2, wherein the riser is rigidly coupled to or formed integrally with the thigh frame.

4. The device of claim 2, wherein a frontal plane joint of the exoskeleton device is defined where the riser and the connecting bar are coupled to one another via a second revolute joint.

5. The device of claim 4, wherein a sagittal plane joint of the exoskeleton device is defined where the connecting bar and the crank frame are coupled to one another via a third revolute joint.

6. The device of claim 1, wherein each of the pair of linear actuators is connected to the crank frame via a passive, two degree-of-freedom ("DOF") joint.

7. The device of claim 6, wherein each of the pair of linear actuators is connected to the thigh frame via a passive, two DOF joint.

8. The device of claim 1, wherein the pair of linear actuators apply forces in parallel between the crank frame and the thigh frame.

9. The device of claim 1, wherein each of the pair of linear actuators is positioned laterally to the user when the exoskeleton is attached to the user.

10. The device of claim 9, wherein a lateral profile of the exoskeleton is no greater than 8 cm from the user's body, and a posterior profile of the exoskeleton is no greater than 3 cm from the user's body.

11. The device of claim 10, wherein each of the pair of linear actuators is aligned with the user's thigh when the exoskeleton device is attached to the user.

12. The device of claim 1, wherein the device is operable to independently control flexion/extension torque and abduction/adduction torque.

13. The device of claim 1, wherein the device is operable to independently control torque in both the frontal and sagittal planes.

14. The device of claim 1, wherein the crank frame is attachable to a pelvis wrap coupleable about the user's waist.

15. The device of claim 14, wherein the thigh frame is attachable to a thigh cuff coupleable about the user's thigh.

16. A powered exoskeleton device for assisting a user's gait in both the user's anatomical sagittal plane and frontal plane, the exoskeleton device comprising:
- a crank frame coupled to a pelvis wrap securable to a user's pelvis;
- a thigh frame coupled to a thigh cuff securable to the user's thigh;
- a riser, rigidly coupled to or formed integrally with the thigh frame and extending from the thigh frame toward the crank frame;
- a connecting bar coupled to the crank frame at a sagittal plane joint which is also revolute, and coupled to the riser at a frontal plane joint which is also revolute; and
- a pair of linear actuators, each independently and rotatably coupled between the crank frame and the thigh frame via passive, two degree-of-freedom ("DOF") joints;
- the crank frame and the thigh frame being restrained relative to one another by a parallel linkage including the pair of linear actuators such that actuation of either one of the linear actuators creates torque in both the sagittal and the frontal plane;
- each of the pair of linear actuators positioned laterally to the user and aligned with the user's thigh when the exoskeleton is attached to the user;

a lateral profile of the exoskeleton device being no greater than 8 cm from the user's body, and a posterior profile of the exoskeleton device being no greater than 3 cm from the user's body.

17. The device of claim 16, wherein the device is operable to independently control flexion/extension torque and abduction/adduction torque.

18. The device of claim 16, wherein the device is operable to independently control torque in both the frontal and sagittal planes.

19. The device of claim 16, wherein the pair of linear actuators apply parallel forces between the crank frame and the thigh frame.

20. The device of claim 16, wherein the connecting bar and the riser define a sagittal-plane revolute joint and a frontal-plane revolute joint having non-parallel axes.

21. The device of claim 16, wherein the parallel linkage forms a closed kinematic chain between the crank frame and the thigh frame.

22. The device of claim 1, wherein the parallel linkage forms a closed kinematic chain between the crank frame and the thigh frame.

23. The device of claim 1, wherein the parallel linkage includes a plurality of joints comprising at least one prismatic joint defined by each linear actuator and a plurality of passive joints including spherical joints and revolute joints.

24. The device of claim 1, wherein each linear actuator is coupled to the crank frame and the thigh frame via respective passive multi-degree-of-freedom joints permitting angular reorientation of the linear actuator relative to the crank frame and the thigh frame.

25. The device of claim 1, wherein the parallel linkage constrains motion of the crank frame relative to the thigh frame such that linear actuation along a single axis produces rotational components about both the sagittal-plane joint and the frontal-plane joint.

26. The device of claim 1, wherein the parallel linkage comprises two parallel five-bar linkages.

* * * * *